UNITED STATES PATENT OFFICE.

RAYMOND B. PRICE, OF NEW YORK, N. Y., ASSIGNOR TO RUBBER REGENERATING COMPANY, A CORPORATION OF INDIANA.

PROCESS OF TREATING TEXTILE MATERIALS AND ARTICLE PRODUCED THEREBY.

1,192,794.             Specification of Letters Patent.     Patented July 25, 1916.

No Drawing. Original application filed January 19, 1912, Serial No. 672,261. Divided and this application filed May 13, 1915. Serial No. 27,760.

*To all whom it may concern:*

Be it known that I, RAYMOND B. PRICE, a citizen of the United States, and a resident of New York, county and State of New York, have invented certain new and useful Improvements in Processes of Treating Textile Materials and Articles Produced Thereby, of which the following is a full, clear, and exact description.

My invention contemplates the treatment of essentially individual fibers capable of use in textile work in such fashion that the fibers remain substantially parallel and will be practically individually coated and permeated with binding material.

This application is a divisional application of my prior application of the same title filed January 19, 1912, Serial No. 672,261.

In the rubber industry it has been customary to grind rags, or vulcanized or unvulcanized scrap containing fabric, in ordinary rubber mixing mills in order to incorporate the fibers into a plastic rubbery mass, which would be strengthened and stiffened by the incorporation of the fibers. Thus, wearing surfaces for rubber belts have frequently been made by first grinding unvulcanized "friction-coated" belt and hose duck in with reclaimed rubber or crude rubber mixtures in the ordinary mixing mill and then calendering the combination and applying it to the outside of the belt. Somewhat similarly, the rag insoles of rubber boots, which requires to be somewhat stiff and yet slightly flexible, have been made by compounding unvulcanized or vulcanized friction cloth with other material, then grinding the combination together, and then calendering and cutting into the proper form for use as insoles. In every one of these operations, without exception, the incorporation of the fiber, whether from woven, braided, knit or loose waste, has been done in the ordinary rubber mixing mill, which sometimes has two rolls running at even speed, but more frequently at unequal speed. In either case, the fiber is ground and twisted into knots and ultimately the staple is seriously shortened, both the strength and length of the fiber being affected. In some cases this grinding is carried to a point where the fiber becomes almost a powder. When this combination is run on the calender there is a tendency of the fibers to assume parallel lines in the direction of the length of the calendered sheet, just as crude rubber itself has a sort of grain in the same direction. Of course, many of the fibers overlap each other, so that it is impossible to coat them perfectly, even if pure rubber is used.

I have found that the fibers, under the above described rubberizing, are not permeated by the rubber, which deposits as a layer on the outside. It is my present aim to overcome this, which I do by subjecting the material to an exhaust which will displace from the air ducts in the fiber, and from between individual fibers any volatile matter, expansive gas, and the like, which under the heat of vulcanization would tend to expand and interfere with the adhesion of the rubber.

My present invention is associated with the idea of maintaining the fibers at their natural strength and length, by combing or otherwise arranging them in essentially parallel directions, and when in that position exhausting and binding them together. Obviously, sheets of such fabric, if it may be so called, may be laminated or arranged in any desired way in relation to each other, so that a product may be built up in which some of the fibers will lie in any desired direction, but all subject to definite plan and control.

In carrying out the invention, I contemplate beginning at the first step, that is to say, to treat the material, such as cotton, before it is worked into a product. Thus, I may take the cotton fibers from the carding or combing machines, and force the binding material, such as for instance, rubber, into and among the fibers while subjecting the same to a vacuum to displace from the air ducts of and from between the fibers any volatile matter, expansive gas and the like, and substitute therefore the binding material. This operation may be performed with or without heat. The resultant product in addition to having the binding material between and holding the fibers together, will have close and direct contact of the binding material with the ducts of the fibers.

Assuming such a product to be used in automobile tires to take the place of the fabric now used, it will be evident that the strength of the tire will depend upon the frictional and binding action of the binding material, rather than upon any twisting of the fibers, although there will be a slight felting or matting action of the fibers under some conditions.

In tires, hose and other material the fibers may be laid radially, diagonally, or a combination of ways.

This construction can be applied to matting, bath brushes, belt covers, heels and soles, and innumerable other articles, and I contemplate using the fibers end on, parallel, and any other way, just so long as the essential strength and length of the fibers are maintained.

The principle of the invention may be applied to such material as cotton waste which has fibers more or less twisted, but which is capable of being carded or combed into essentially parallel lines. In this case there will be some twist in the original strands and my invention relates to the method of making them parallel by carding or combing. Similarly, old cotton duck or woolen fabric may be combed out and their fibers thus put in essentially parallel directions.

What I claim and desire to protect by Letters Patent is:

1. The process of treating textile material which consists in disposing fibers in substantially parallel relation, and exhausting and treating them with a strengthening or binding medium.

2. The process of treating textile material which consists in carding or combing the material into substantially parallel lines as to its fiber, and exhausting and binding the fibers together by means of a strengthening or binding medium.

3. An article embodying fiber extending in parallel relation, and a strengthening or binding medium in close contact with the ducts of and between and holding the fibers together.

4. An article embodying fibers in groups, wherein the fibers of each group lie parallel with each other, and a strengthening or binding medium in close contact with the ducts of and holding the fibers together.

Signed at New York, county and State of New York, this 12th day of May, 1915.

RAYMOND B. PRICE.